(12) United States Patent
Jung et al.

(10) Patent No.: US 11,285,904 B2
(45) Date of Patent: Mar. 29, 2022

(54) SEAT AIRBAG FOR VEHICLE

(71) Applicants: Hyundai Motor Company, Seoul (KR); Kia Motors Corporation, Seoul (KR)

(72) Inventors: Yu Mi Jung, Gyeonggi-do (KR); Hyock In Kwon, Gyeonggi-do (KR); Hyo Shub Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/876,790

(22) Filed: May 18, 2020

(65) Prior Publication Data
US 2021/0061211 A1   Mar. 4, 2021

(30) Foreign Application Priority Data
Aug. 29, 2019   (KR) .......................... 10-2019-0106263

(51) Int. Cl.
*B60R 21/207*   (2006.01)
*B60R 21/216*   (2011.01)
*B60R 21/2338*   (2011.01)
*B60R 21/26*   (2011.01)
*B60R 21/233*   (2006.01)
(Continued)

(52) U.S. Cl.
CPC .......... *B60R 21/207* (2013.01); *B60R 21/216* (2013.01); *B60R 21/233* (2013.01); *B60R 21/2338* (2013.01); *B60R 21/26* (2013.01); *B60R 2021/0048* (2013.01); *B60R 2021/2074* (2013.01); *B60R 2021/2161* (2013.01); *B60R 2021/23146* (2013.01); *B60R 2021/23382* (2013.01)

(58) Field of Classification Search
CPC . B60R 21/207; B60R 21/216; B60R 21/2338; B60R 21/26; B60R 21/233; B60R 2021/23146; B60R 2021/23382; B60R 2021/2074; B60R 2021/2161; B60R 2021/0048; B60R 2021/23386; B60R 21/264; B60R 21/237; B60R 21/215
See application file for complete search history.

(56) References Cited

U.S. PATENT DOCUMENTS 11,052,861 B2 *  7/2021  Park .................. B60R 21/207
2017/0247006 A1   8/2017  Rao et al.
(Continued)

FOREIGN PATENT DOCUMENTS

CN   112896086 A *   6/2021   ........... B60R 21/207
DE   102017008166 A1 *   4/2018   ........... B60R 21/233
(Continued)

*Primary Examiner* — Drew J Brown
(74) *Attorney, Agent, or Firm* — Mintz Levin Cohn Ferris Glovsky and Popeo, P.C.; Peter F. Corless

(57) ABSTRACT

A seat airbag for a vehicle includes a first cushion and a second cushion located at the upper end portion of a seatback and configured to be inflated upwards on opposite sides of an occupant sitting in a seat and subsequently to be bent downwards from an upper side of the occupant to cause an end portion of each of the first cushion and the second cushion to be located in front of the occupant. A third cushion is disposed between the first cushion and the second cushion to connect the first cushion and the second cushion to each other.

15 Claims, 17 Drawing Sheets

(51) Int. Cl.
    *B60R 21/00*       (2006.01)
    *B60R 21/231*    (2011.01)

(56) References Cited

U.S. PATENT DOCUMENTS

| | | | |
|---|---|---|---|
| 2018/0222432 A1* | 8/2018 | Schneider | B60R 21/261 |
| 2019/0016288 A1* | 1/2019 | Schneider | B60R 21/23138 |
| 2019/0016293 A1* | 1/2019 | Saso | B60R 21/207 |
| 2019/0248322 A1* | 8/2019 | Herzenstiel | B60R 21/207 |
| 2021/0039578 A1* | 2/2021 | Rupp | B60R 21/231 |
| 2021/0122318 A1* | 4/2021 | Yoo | B60R 21/276 |
| 2021/0179009 A1* | 6/2021 | Lee | B60R 21/2338 |

FOREIGN PATENT DOCUMENTS

| | | | | |
|---|---|---|---|---|
| DE | 102016225402 A1 * | 6/2018 | | B60N 2/5621 |
| DE | 102019116564 A1 * | 12/2019 | | B60R 21/231 |
| DE | 102019124091 A1 * | 7/2020 | | B60R 21/233 |
| EP | 3792119 A1 * | 3/2021 | | B60R 21/207 |
| KR | 20200145120 A * | 12/2020 | | B60R 21/207 |
| KR | 20210065627 A * | 6/2021 | | B60R 21/207 |
| KR | 20210065628 A * | 6/2021 | | B60R 21/207 |
| WO | WO-2019107398 A1 * | 6/2019 | | B60R 21/2338 |

\* cited by examiner

SEAT AIRBAG FOR VEHICLE

CROSS-REFERENCE TO RELATED APPLICATION

This application claims the priority benefit of Korean Patent Application No. 10-2019-0106263, filed on Aug. 29, 2019, the disclosure of which is incorporated herein by reference.

BACKGROUND

1. Field of the Disclosure

The present disclosure relates to a seat airbag for a vehicle, and more particularly, to a seat airbag for safely protecting an occupant even when a seat is being rotated or reclined to various angles.

2. Description of the Related Art

With the recent development of autonomous vehicles, the interior space of vehicles is also changing. Among the parts provided in the interior space within a vehicle, alternate seat configurations are being developed due to the autonomous driving function of a vehicle. A conventional seat is only capable of being adjusted in height at a fixed position in the state of being oriented to face the forward direction of a vehicle. Due to the autonomous driving function of a vehicle, since a driver is not required to face forward for driving, a seat has recently been developed to be movable to be oriented backwards or sideways.

However, when a seat is oriented in directions other than a forward direction, an occupant may not be protected by a conventional airbag since a conventional airbag installed in a vehicle is designed on the assumption that a seat is oriented forwards. Thus, when a seat is installed to be rotatable or movable in a vehicle, a conventional airbag may not effectively protect an occupant in the event of an accident. Therefore, there is the need to develop technology of effectively protecting an occupant by integrating an airbag with a seat in an autonomous vehicle.

The information disclosed in this section is merely for enhancement of understanding of the general background of the disclosure and should not be taken as an acknowledgement or any form of suggestion that this information forms the related art already known to a person skilled in the art.

SUMMARY

Therefore, the present disclosure provides a seat airbag for a vehicle capable of being applied to autonomous vehicles and working at various angles to which a seat is oriented and at various collision angles, thereby most effectively protecting an occupant.

In accordance with the present disclosure, the above and other objects can be accomplished by the provision of a seat airbag for a vehicle that may include a first cushion and a second cushion disposed at an upper end portion of a seatback, the first cushion and the second cushion being configured to be inflated upwards on opposite sides of an occupant and subsequently to be bent downwards and inwards from an upper side of the occupant such that an end portion of each of the first cushion and the second cushion is disposed in front of the occupant, and a third cushion disposed between the first cushion and the second cushion, the third cushion connecting the first cushion and the second cushion to each other.

The first cushion and the second cushion may receive gas from an inflator disposed at the upper end portion of the seatback, and may be independently inflated on opposite sides of the head of the occupant. The third cushion may communicate with at least one of the first cushion or the second cushion to receive gas therefrom, and may be inflated with the received gas.

When the first cushion and the second cushion are fully inflated, the first cushion and the second cushion may cover the shoulders of the occupant from above and may expand to be bent to the front side of the occupant. When the third cushion is fully inflated, the third cushion may be disposed in front of the occupant and may have a shape that is concavely recessed inwards to support the front side of the head of the occupant.

The seat airbag may further include a first fixing tether secured at a first end thereof to the upper end portion or the side surface of the seatback and coupled at a second end thereof to the end portion of the first cushion or the second cushion. When the first cushion or the second cushion is inflated, the first fixing tether may apply tension to the first cushion or the second cushion to cause the end portion of the first cushion or the second cushion to move forward along a predetermined curved path.

The first end of the first fixing tether may be secured to the seatback via a driving device configured to operate to pull the first fixing tether at a predetermined time point. The first fixing tether may be configured such that a portion between the first end and the second end thereof surrounds and supports each of side portions of the occupant to restrain the movement of the occupant.

The seat airbag may further include a first connection tether coupled at a first end thereof to the end portion of the first cushion or the second cushion, which is inflated toward the front side of the occupant, and coupled at a second end thereof to the middle portion of the first cushion or the second cushion, which is inflated toward the upper side of the occupant, and a second fixing tether secured at a first end thereof to the upper end portion or the side surface of the seatback and coupled at a second end thereof to a portion between the first end and the second end of the first connection tether.

The second fixing tether may be coupled to a portion adjacent to the first end of the first connection tether. The seat airbag may further include a third fixing tether secured at a first end thereof to the upper end portion or the side surface of the seatback and coupled at a second end thereof to a portion adjacent to the second end of the first connection tether.

The seat airbag may further include a cover disposed at the upper end portion of the seatback in a folded state. When the first cushion or the second cushion is inflated, the cover may be unfolded on the top surface of the first cushion or the top surface of the second cushion and may press the first cushion or the second cushion downwards.

The cover may be formed to extend in a lateral direction and may press the top surface of the first cushion and the top surface of the second cushion simultaneously. The seat airbag may further include a fourth fixing tether secured at a first end thereof to the upper end portion or the side surface of the seatback and coupled at a second end thereof to a portion between a first end and a second end of the cover.

While folded, the cover may be disposed on the first cushion or the second cushion located in a case. When the first cushion or the second cushion is inflated, the cover may be unfolded such that a first end thereof is fixed to the case and a second end thereof moves upwards and forwards. The cover may have a cutting line formed at a portion adjacent to the first end thereof. When tension having a predetermined magnitude or greater is applied to the cover, the cover may be cut along the cutting line and may be separated from the case.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
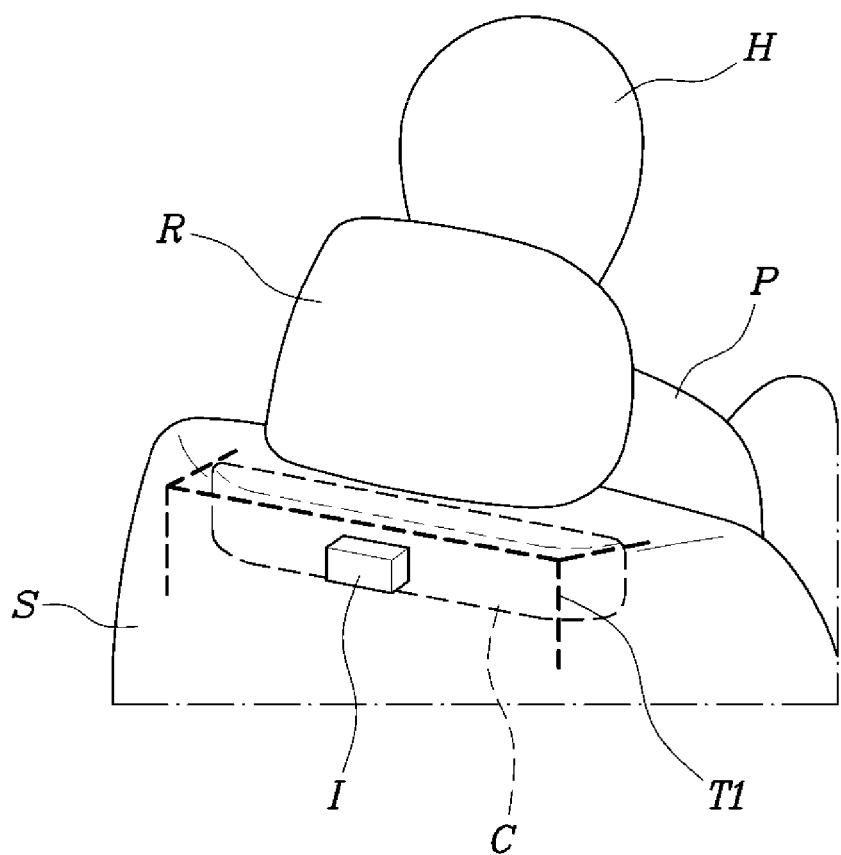
FIG. 1 is a view illustrating a seatback of a vehicle at which a seat airbag for a vehicle according to an exemplary embodiment of the present disclosure is located.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms and should not be construed as being limited only to the exemplary embodiments set forth herein.

Accordingly, while exemplary embodiments of the disclosure are capable of being variously modified and taking alternative forms, exemplary embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Reference will now be made in detail to the exemplary embodiments of the present disclosure, examples of which are illustrated in the accompanying drawings. Wherever possible, the same reference numbers will be used throughout the drawings to refer to the same or like parts.

Figure 2:
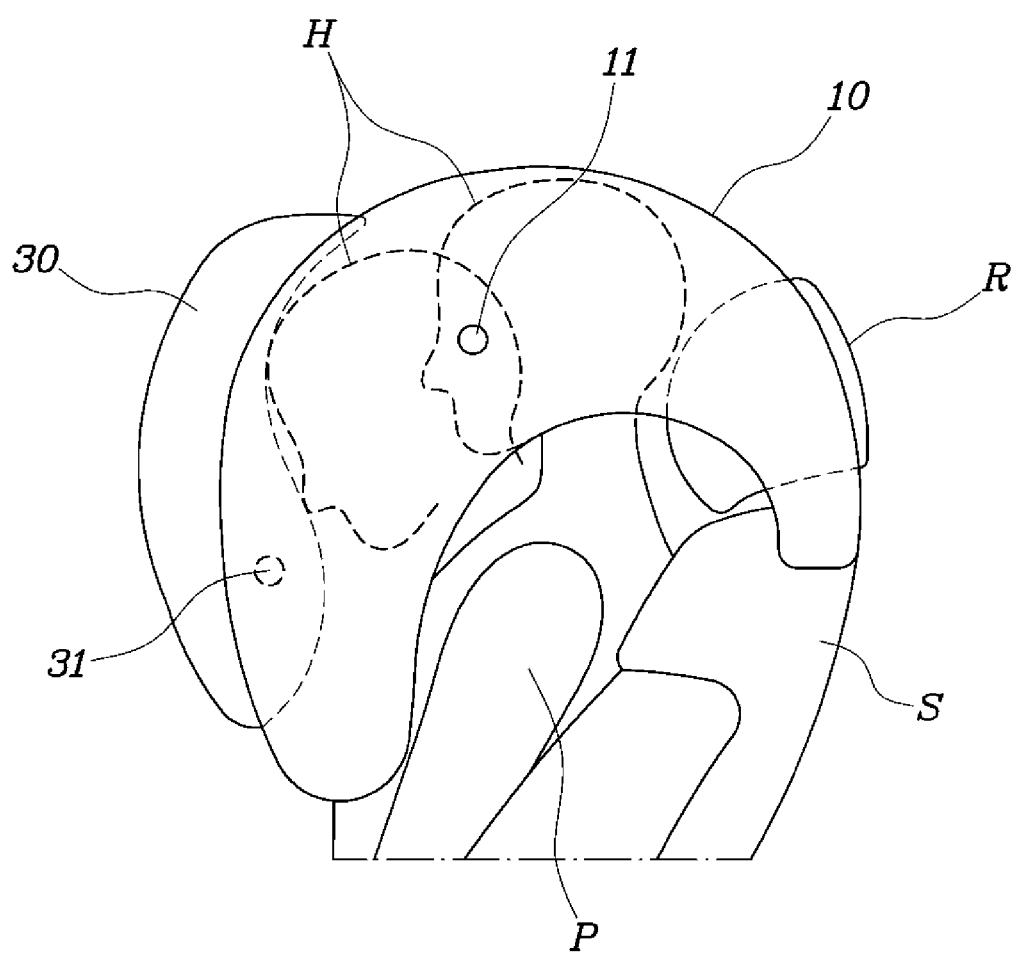
FIGS. 2 to 4 are a side view, a front view, and a rear view, respectively, illustrating the state in which the seat airbag for a vehicle according to the exemplary embodiment of the present disclosure is fully inflated.
Figure 3:
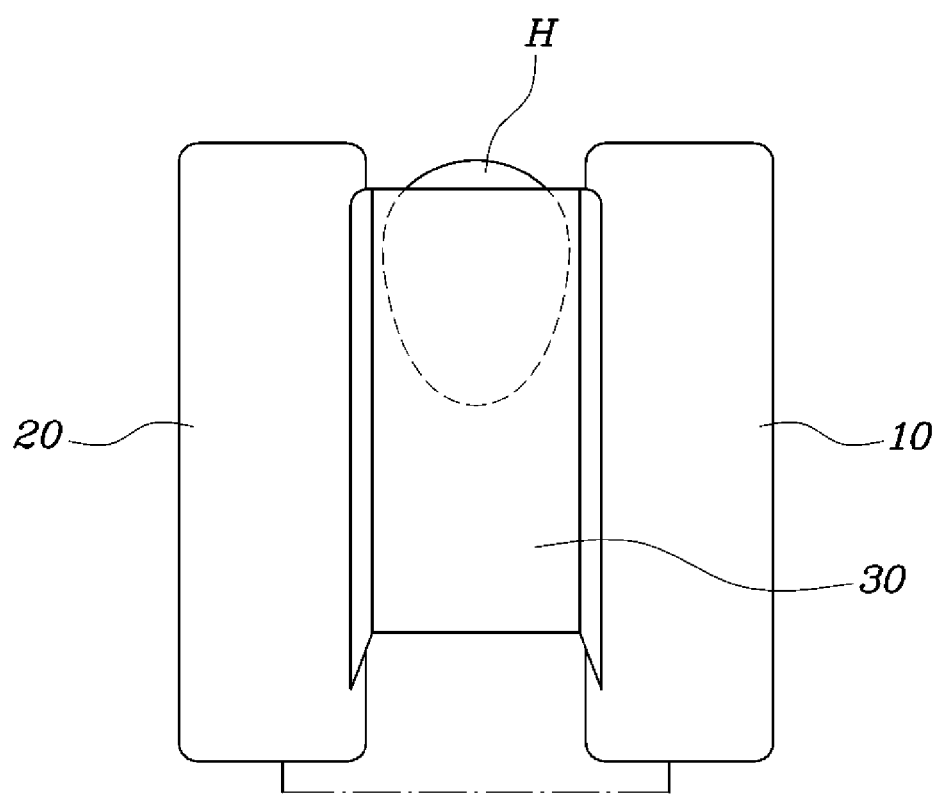
Figure 4:
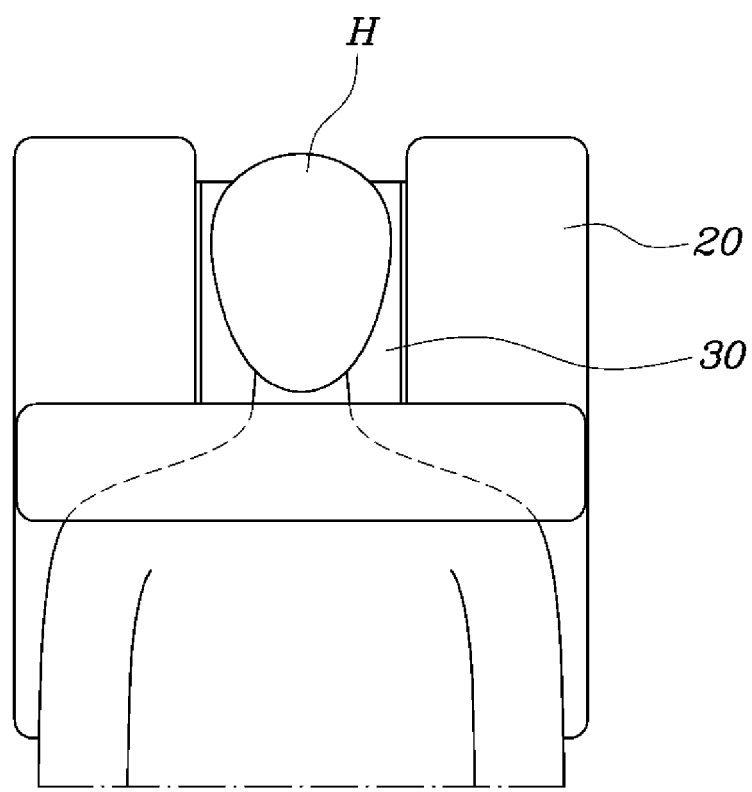

FIG. 1 is a view illustrating a seatback S of a vehicle at which a seat airbag for a vehicle according to an exemplary embodiment of the present disclosure is located, and FIGS. 2 to 4 are a side view, a front view, and a rear view, respectively, illustrating the state in which the seat airbag for a vehicle according to the exemplary embodiment of the present disclosure is fully inflated.

Referring to FIGS. 1 to 4, a seat airbag for a vehicle according to an exemplary embodiment of the present disclosure may include a first cushion 10 and a second cushion 20, which are located at the upper end portion of a seatback S and are configured to be inflated upwards on opposite sides of an occupant P and subsequently to be bent downwards and inwards from an upper side of the occupant P such that an end portion of each of the first cushion 10 and the second cushion 20 is located in front of the occupant P. The airbag may further include a third cushion 30, located between the first cushion 10 and the second cushion 20 to connect the first cushion 10 and the second cushion 20 to each other.

Before being inflated, the first cushion 10, the second cushion 20, and the third cushion 30 may be disposed at the upper end portion of the seatback S. Specifically, the first cushion 10, the second cushion 20, and the third cushion 30 may be disposed inside a case C to be described later. An inflator I may also be disposed inside the case C to inflate the first cushion 10, the second cushion 20, and the third cushion 30 in response to a collision signal. In particular, the case C and an opening line T1 in the seatback S may be disposed at the rear side of a headrest R on the upper end portion of the seatback S. Accordingly, the first cushion 10, the second cushion 20, and the third cushion 30 may be inflated at the rear of the headrest R and may expand to be bent forwards.

Figure 5A:
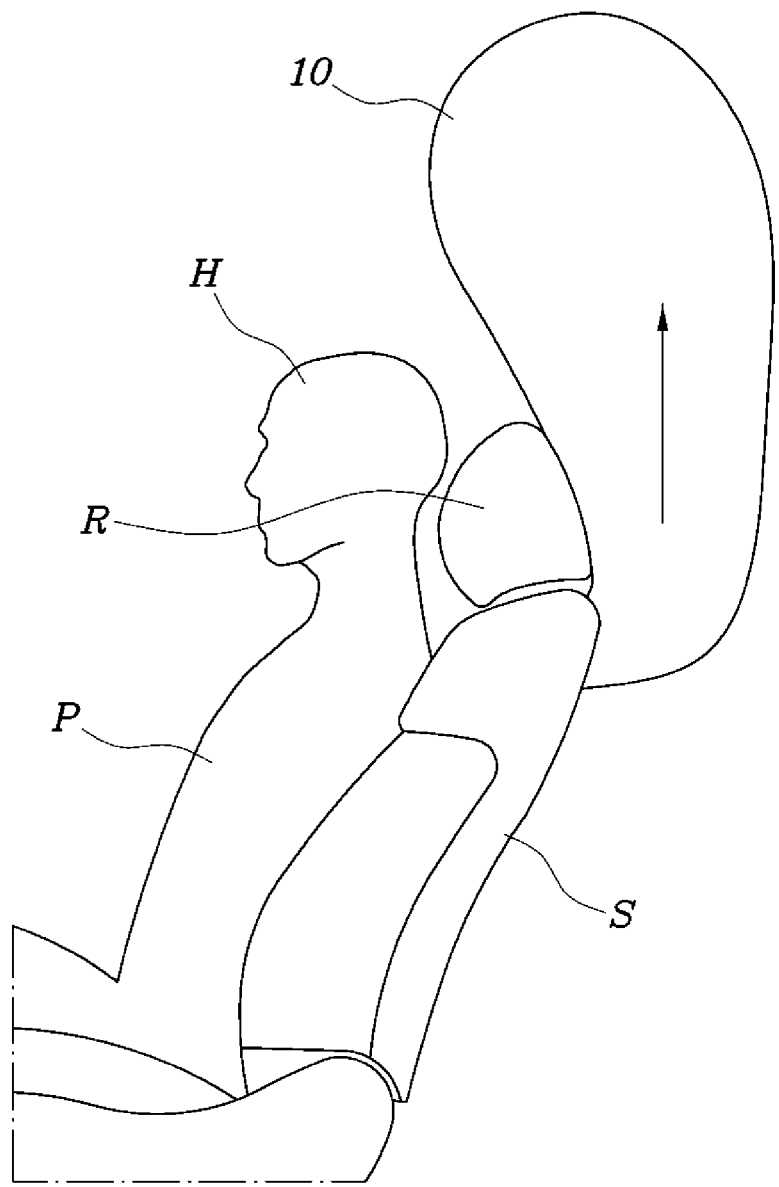
FIGS. 5A to 5C are views sequentially illustrating the steps in which the seat airbag for a vehicle according to the exemplary embodiment of the present disclosure is inflated.
Figure 5B:
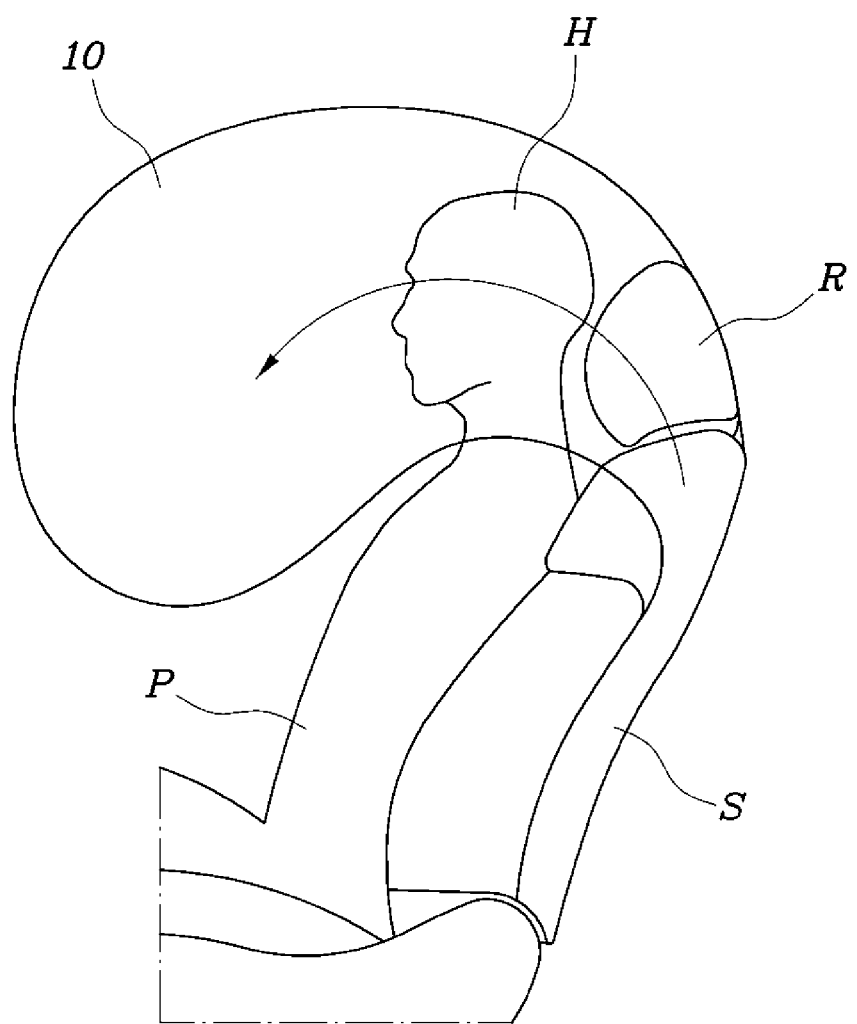
Figure 5C:
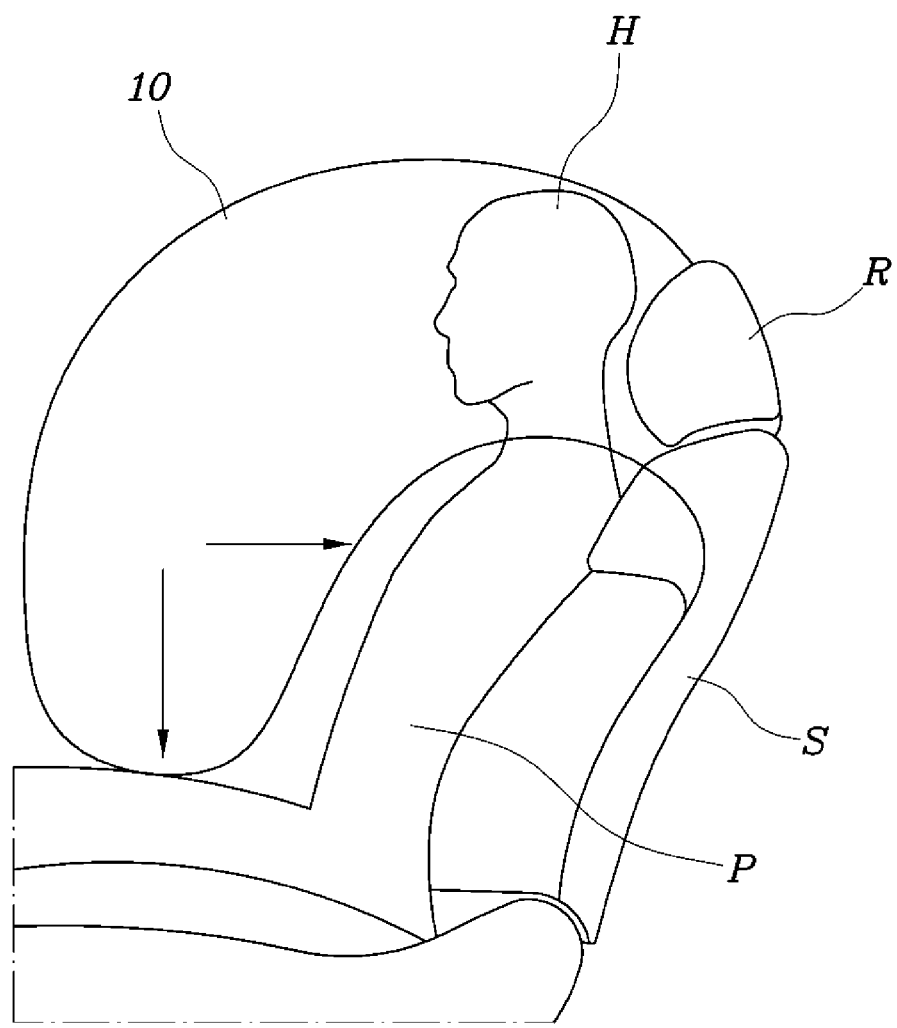

FIGS. 5A to 5C are views sequentially illustrating the steps in which the seat airbag for a vehicle according to the exemplary embodiment of the present disclosure is inflated. Referring to FIGS. 5A to 5C, the first cushion 10 and the second cushion 20 may be respectively inflated upwards on opposite sides of the occupant P, and subsequently may be bent downwards and inwards.

Accordingly, when inflated, the first cushion 10 and the second cushion 20 may cover the shoulders of the occupant P such that the end portions thereof move downwards to be located in front of the occupant P. In other words, the first cushion 10 and the second cushion 20 may be worn on the occupant P such that the first cushion 10 and the second cushion 20 are first inflated toward the upper side of the occupant P and then are bent in the direction of covering the front side of the occupant P.

The first cushion 10 and the second cushion 20 may cover the shoulders of the occupant P on opposite sides of the head H of the occupant P when the cushions are fully inflated. The first cushion 10 and the second cushion 20 may support the head H of the occupant P on opposite sides of the head H and may also support the shoulders of the occupant P at front sides of the shoulders, thereby preventing the body of the occupant P from moving during the collision.

The third cushion 30 may be disposed between the first cushion 10 and the second cushion 20 and may connect the first cushion 10 and the second cushion 20 to each other. In particular, the third cushion 30 may communicate with the first cushion 10 and the second cushion 20. When the third cushion 30 is fully inflated, the third cushion 30 may be located in front of the head H of the occupant P and may support the head H of the occupant P to prevent the head H of the occupant P from moving forwards.

Accordingly, the seat airbag for a vehicle of the present disclosure, which includes the first cushion 10, the second cushion 20, and the third cushion 30, may cover all of the front side and lateral sides of the occupant P, and thus may reduce the risk of injury to the occupant P. Specifically, the first cushion 10 and the second cushion 20 may be configured to receive gas from the inflator I, located at the upper end portion of the seatback S, and may be independently inflated on opposite sides of the head H of the occupant P.

The first cushion 10 and the second cushion 20 may be configured to simultaneously receive gas from a single inflator I. However, the first cushion 10 and the second cushion 20 may be separately inflated on the left side and the right side of the head H of the occupant P. The third cushion 30 may communicate with at least one of the first cushion 10 or the second cushion 20 to receive gas therefrom, and may be inflated with the received gas.

Particularly, the third cushion 30 may communicate with at least one of the first cushion 10 or the second cushion 20 through an inner vent aperture 31 formed between the third cushion 30 and at least one of the first cushion 10 or the second cushion 20. Gas supplied to the first cushion 10 and the second cushion 20 may flow to the third cushion 30 through the inner vent aperture 31.

Each of the first cushion 10 and the second cushion 20 may further include an outer vent aperture 11 formed therein. The outer vent aperture 11 may prevent the occupant P from being injured by the internal pressure of the first cushion 10, the second cushion 20, or the third cushion 30. Specifically, when the first cushion 10 and the second cushion 20 are fully inflated, the first cushion 10 and the second cushion 20 may cover the shoulders of the occupant P from above and may expand to be bent to the front side of the occupant P.

In addition, when the third cushion 30 is fully inflated, the third cushion 30 may be located in front of the occupant P and may have a shape that is concavely recessed inwards to safely support the front side of the head H of the occupant P. In other words, when the third cushion 30 is fully inflated, the third cushion 30 may be located in front of the head H of the occupant P and may support the head H of the occupant P to prevent the head H of the occupant P from moving forwards. In particular, the surface of the third cushion 30 that faces the head H of the occupant P may be formed in a concave shape to support the head H of the occupant P by the concave surface of the third cushion 30, thereby absorbing impacts applied to the head H of the occupant P and thus ensuring occupant P safety.

Further, the seat airbag according to the exemplary embodiment of the present disclosure may further include a base cushion (not illustrated) disposed at the upper end portion of the seatback S. Each of the first cushion 10 and the second cushion 20 may be connected to the base cushion (not illustrated) to be inflated from the base cushion (not illustrated). The base cushion (not illustrated) may be inflated by directly receiving gas from the inflator I. In addition, the base cushion (not illustrated) may communicate with the first cushion 10 and the second cushion 20 and may distribute the gas to the first cushion 10 and the second cushion 20.

Figure 6A:
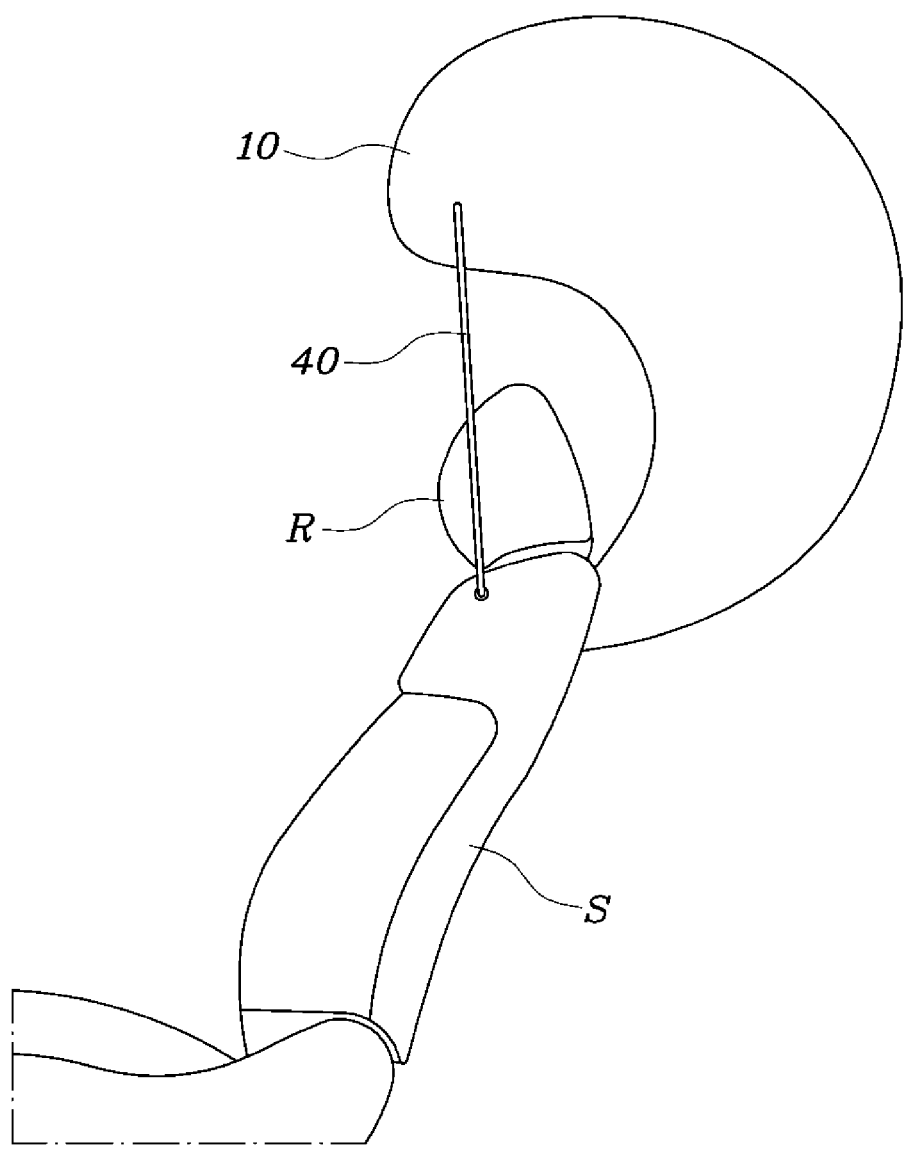
FIGS. 6A and 6B are views illustrating the coupling of a first fixing tether according to an exemplary embodiment of the present disclosure.
Figure 6B:
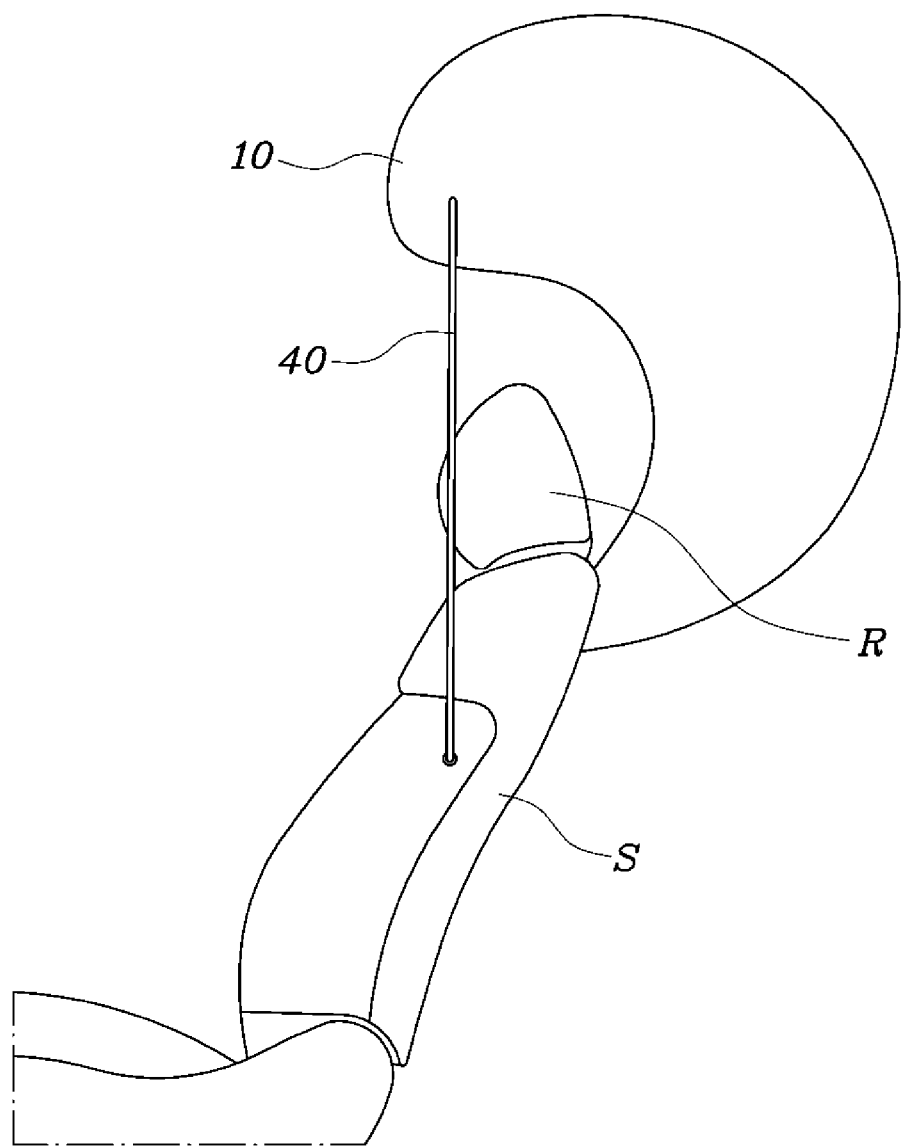

FIGS. 6A and 6B are views illustrating the coupling of a first fixing tether 40 according to an exemplary embodiment of the present disclosure. Referring to FIGS. 6A and 6B, the first fixing tether 40 may be coupled to the upper end portion of the seatback S (see FIG. 6A), or may be coupled to the side surface of the seatback S (see FIG. 6B). In particular, the first fixing tether 40 and tethers to be described later may be secured to a frame of the seatback S.

When the first fixing tether 40 is coupled to the upper end portion of the seatback S, the first fixing tether 40 may be drawn out through the opening line T1 formed in the upper end portion of the seatback S. When the first fixing tether 40 is coupled to the side surface of the seatback S, the first fixing tether 40 may be drawn out through a separate side line, which is opened by inflation of a side airbag (SAB).

Figure 7:
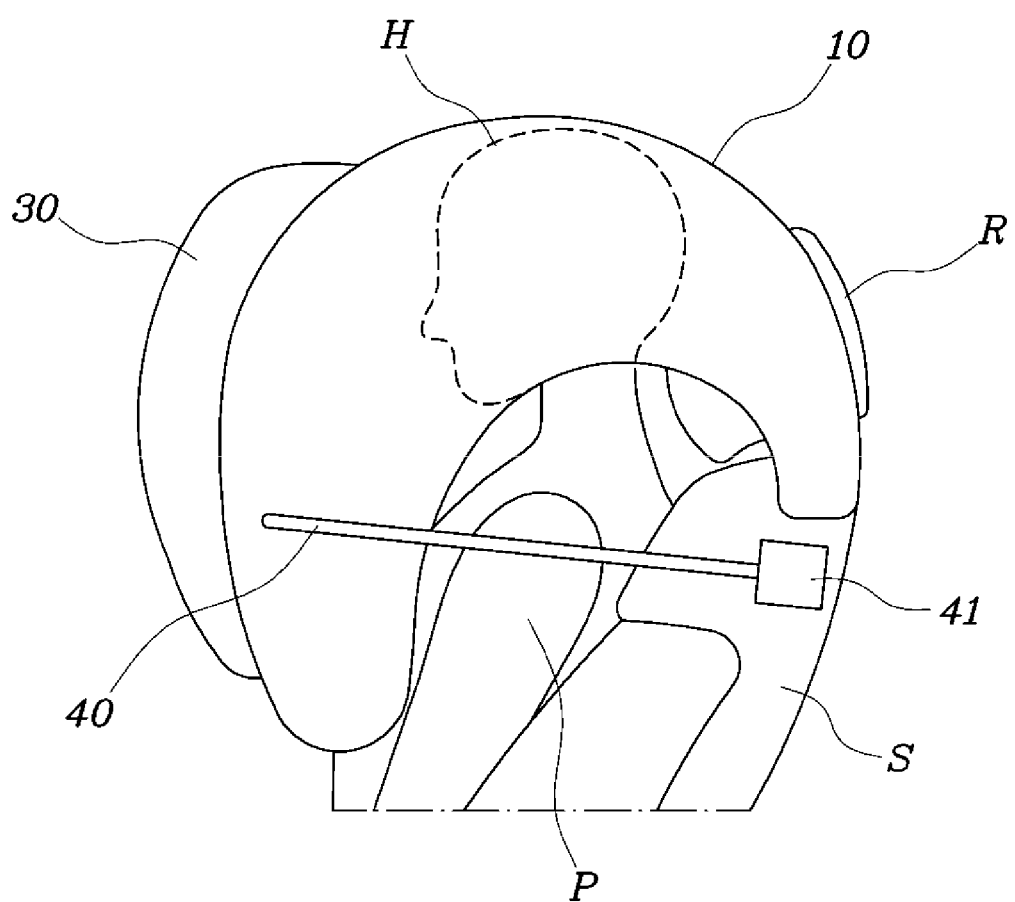
FIGS. 7 to 10 are views illustrating the coupling of tethers according to various exemplary embodiments of the present disclosure.

FIGS. 7 to 10 are views illustrating the coupling of tethers according to various exemplary embodiments of the present disclosure. Referring to FIG. 7, the seat airbag for a vehicle according to an exemplary embodiment of the present disclosure may further include a first fixing tether 40, a first end of which may be secured to the upper end portion or the side surface of the seatback S and a second end (e.g., an opposite end) of which may be coupled to an end portion of the first cushion 10 or the second cushion 20. When the first cushion 10 or the second cushion 20 is inflated, the first fixing tether 40 may apply tension to the first cushion 10 or the second cushion 20 to cause the end portion of the first cushion 10 or the second cushion 20 to move forward along a predetermined curved path.

When the first fixing tether 40, which is secured at a first end thereof to the seatback S, extends upwards to a predetermined length due to the inflation of the first cushion 10 or the second cushion 20, the first fixing tether 40 may apply tension to the end portion of the first cushion 10 or the second cushion 20, to which the second end of the first fixing tether 40 is coupled, to cause the first cushion 10 or the second cushion 20 to be bent forwards. In addition, the first end of the first fixing tether 40 may be secured to the seatback S via a driving device 41 configured to operate to pull the first fixing tether 40 at a predetermined time point. The predetermined length may be a length before deformation of the fixing tether 40, or a length from the position where the end portion of the first cushion 10 or the second cushion 20 are rotatable without interference with the occupant P to the seatback S.

In one exemplary embodiment, the driving device 41 may be a device that pulls the first fixing tether 40 using a pulley. The driving device 41 may be operated when a predetermined amount of time passes or elapses after the operation of the inflator I. Specifically, the driving device 41 may cause the first cushion 10 and the second cushion 20 to be bent to the front side of the occupant P after being inflated upwards, or may operate in the state in which an end portion of each of the first cushion 10 and the second cushion 20 is located in front of the occupant P such that the first cushion 10 and the second cushion 20 securely hold and support the occupant P.

Figure 8:
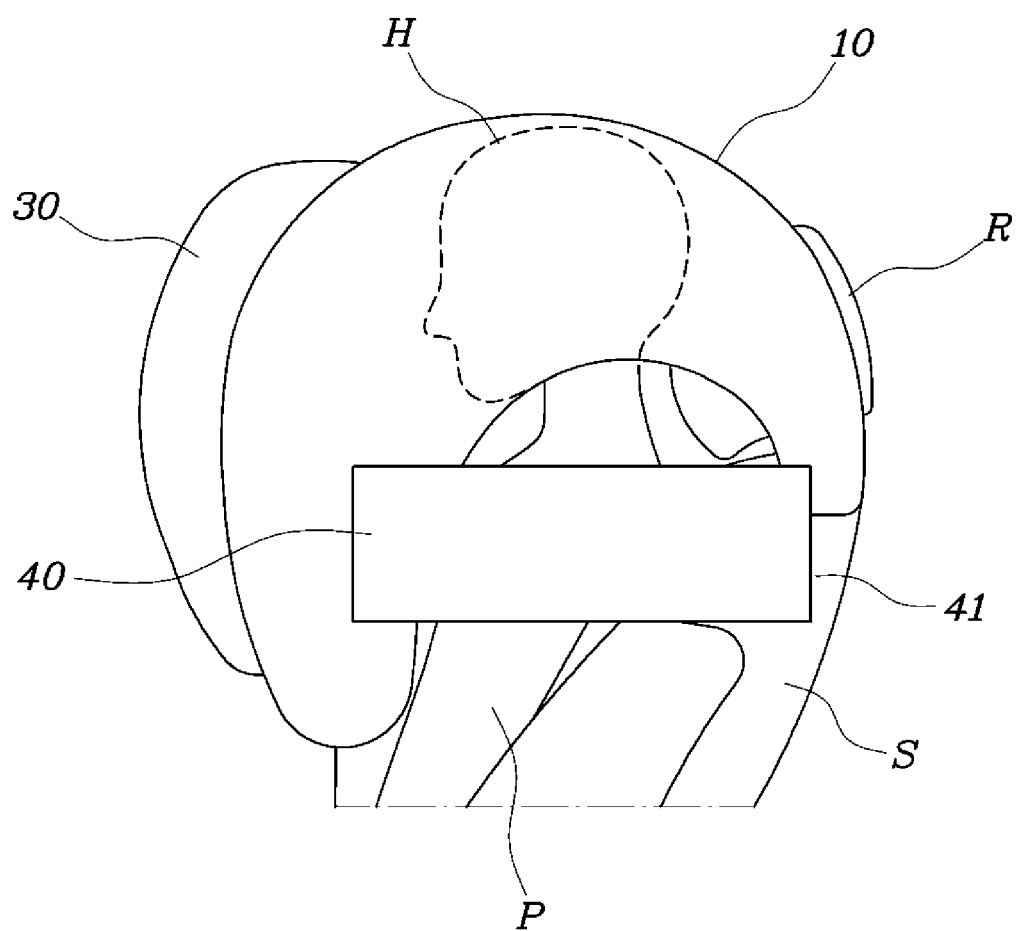

Referring to FIG. 8, a portion between the first end and the second end of the first fixing tether 40 may surround and support each of the side portions of the occupant P to restrain the movement of the occupant P. The first fixing tether 40 may be formed to have a wide width to surround each of the side portions of the occupant P. In one exemplary embodiment, the first fixing tether 40 may be formed to have a width capable of covering the part from the neck to each shoulder of the occupant P.

That is, the first fixing tether 40 may restrain the lateral movement of the occupant P while surrounding the occupant P from the outside of each shoulder of the occupant P.

Figure 9:
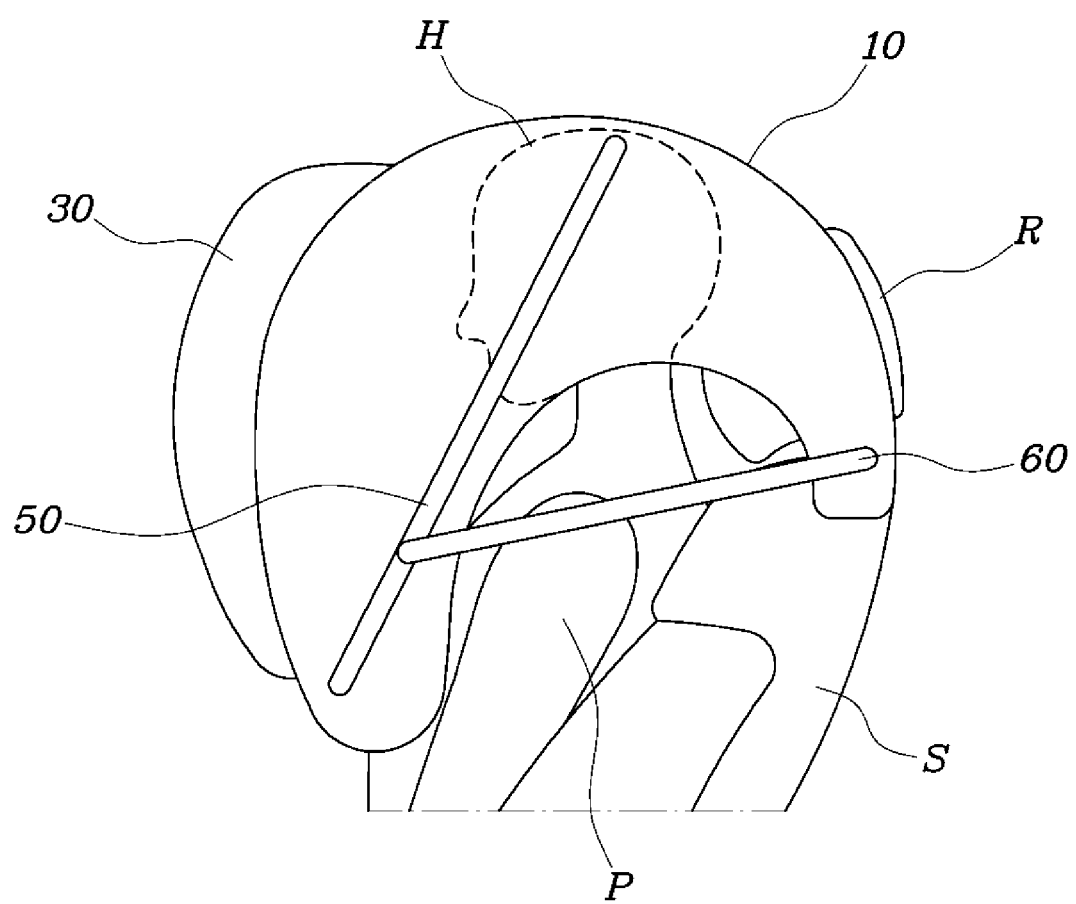

Referring to FIG. 9, the seat airbag for a vehicle according to an exemplary embodiment of the present disclosure may further include a first connection tether 50, a first end of which may be coupled to an end portion of the first cushion 10 or the second cushion 20, which is inflated toward the front side of the occupant P, and a second end (e.g., an opposite end) of which may be coupled to a middle portion of the first cushion 10 or the second cushion 20, which is inflated toward the upper side of the occupant P. The airbag may further include a second fixing tether 60, a first end of which may be secured to the upper end portion or the side surface of the seatback S and a second end (e.g., an opposite end) of which may be coupled to a portion between the first end and the second end of the first connection tether 50.

When the first cushion 10 or the second cushion 20 is fully inflated, the end portion of the first cushion 10 or the second cushion 20, which is located in front of the occupant P, and the middle portion of the first cushion 10 or the second cushion 20, which is located above the occupant P, may be connected to each other via the first connection tether 50, the first end and the second end of which may be coupled to the end portion and the middle portion of the first cushion 10 or the second cushion 20, respectively. The second fixing tether 60 may be coupled to a portion between the first end and the second end of the first connection tether 50 and may apply tension to the first connection tether 50. The tension applied to the first connection tether 50 by the second fixing tether 60 may be transmitted to the first end and the second end of the first connection tether 50 and may be applied to the first cushion 10 or the second cushion 20.

Figure 10:
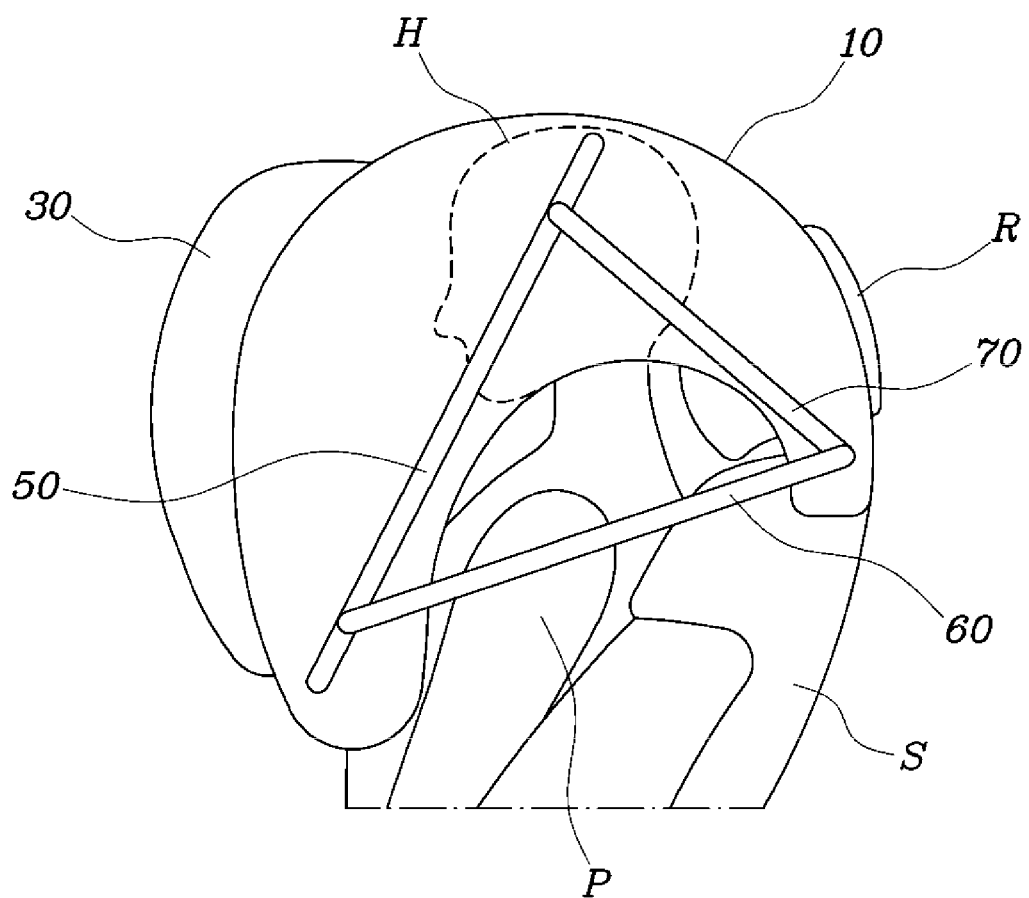

Referring to FIG. 10, the second fixing tether 60 may be coupled to a portion adjacent to the first end of the first connection tether 50. The seat airbag for a vehicle according to an exemplary embodiment of the present disclosure may further include a third fixing tether 70, a first end of which may be secured to the upper end portion or the side surface of the seatback S and a second end (e.g., an opposite end) of which may be coupled to a portion adjacent to the second end of the first connection tether 50.

The first end of the second fixing tether 60 and the first end of the third fixing tether 70 may be secured to the seatback S, and the second end of the second fixing tether 60 and the second end of the third fixing tether 70 may be coupled to the first connection tether 50 while being spaced apart from each other. The second end of each of the second fixing tether 60 and the third fixing tether 70 may be coupled to the first connection tether 50 and may apply tension to the first connection tether 50.

The resultant force of the tension applied to the first connection tether 50 by the second fixing tether 60 and the tension applied to the first connection tether 50 by the third fixing tether 70 may cause the first cushion 10 or the second cushion 20 to be inflated toward the front side of the occupant P. The second fixing tether 60 and the third fixing tether 70 may be sewn or otherwise attached to the first connection tether 50.

Figure 11:
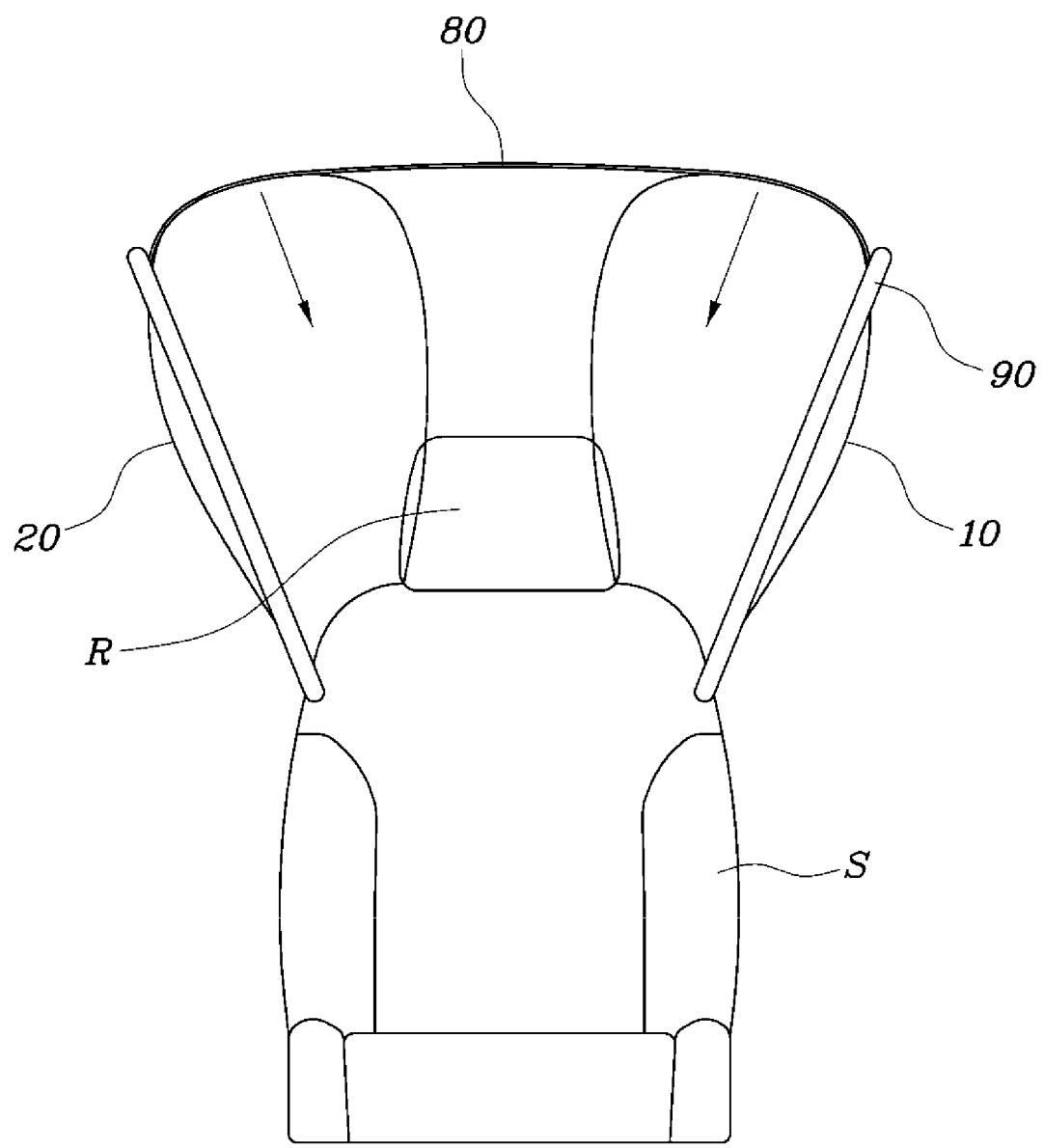
FIGS. 11 and 12 are views illustrating a seat airbag for a vehicle including a cover according to an exemplary embodiment of the present disclosure.
Figure 12:
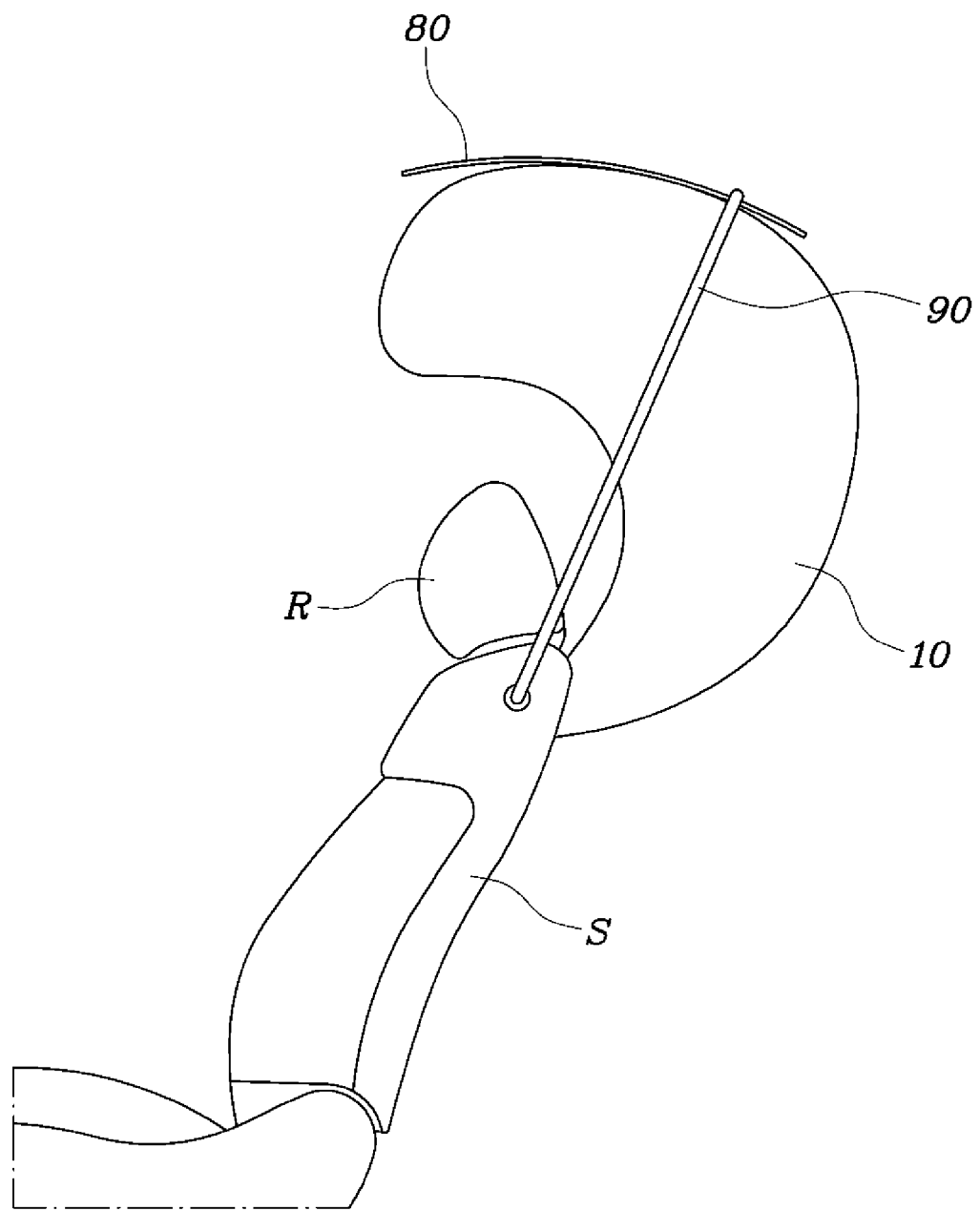
Figure 13A:
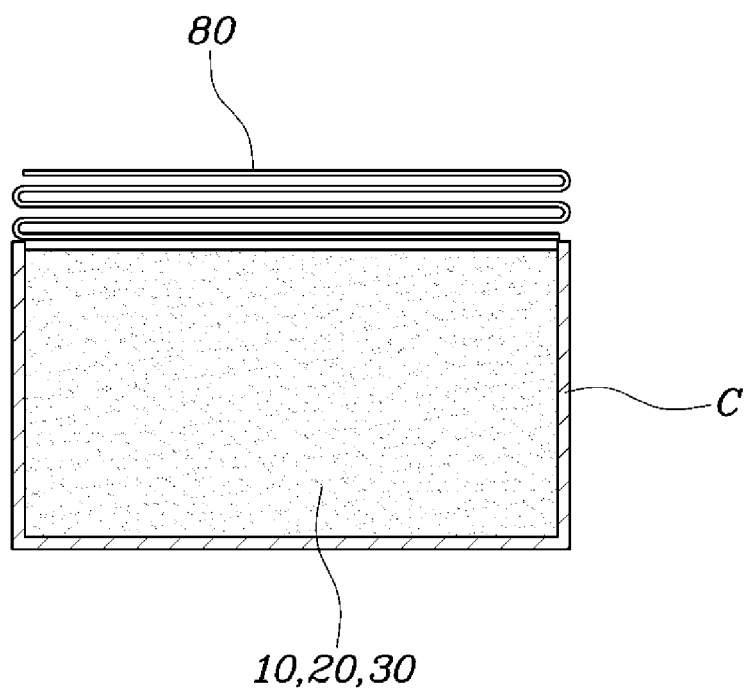
FIGS. 13A and 13B are views illustrating a cover according to an exemplary embodiment of the present disclosure.
Figure 13B:
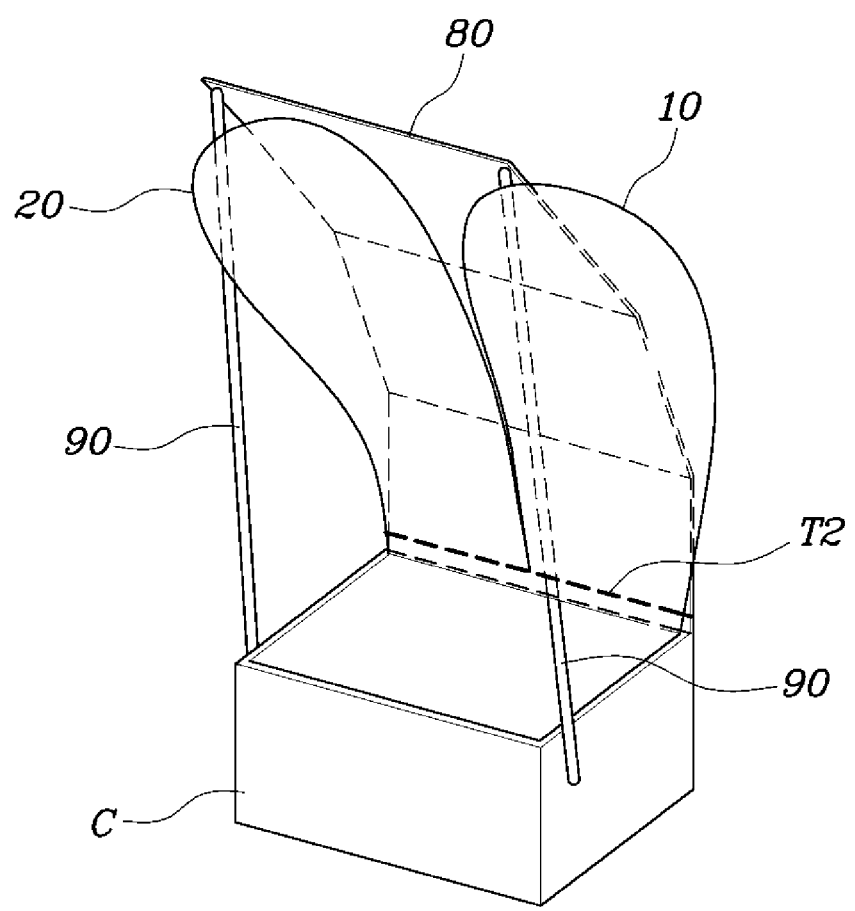

FIGS. 11 and 12 are views illustrating a seat airbag for a vehicle including a cover 80 according to an exemplary embodiment of the present disclosure, and FIGS. 13A and 13B are views illustrating a cover 80 according to an exemplary embodiment of the present disclosure.

Referring to FIGS. 11 to 13, the seat airbag for a vehicle according to an exemplary embodiment of the present disclosure may further include a cover 80, mounted at the upper end portion of the seatback S in a folded state and which is unfolded on the top surface of the first cushion 10 or the second cushion 20 when the first cushion 10 or the second cushion 20 is inflated to press the first cushion 10 or the second cushion 20 downwards.

The cover 80 may be a panel capable of being folded or bent similar to a flap. Additionally, the cover 80 may be mounted at the upper end portion of the seatback S together with the first cushion 10 and the second cushion 20 in a folded state. When the first cushion 10 and the second cushion 20 are inflated, the cover 80 may be unfolded simultaneously therewith and may press the first cushion 10 and the second cushion 20 downwards from above the first cushion 10 and the second cushion 20. Accordingly, after being inflated upwards, the first cushion 10 and the second cushion 20 may be bent downwards.

The cover 80 may be formed to extend in a lateral direction and may press the top surface of the first cushion 10 and the top surface of the second cushion 20 simultaneously. In other words, the cover 80 may be folded in the state of extending in the lateral direction. Further, the cover 80 may extend a length greater than the width of the seatback S to cover the first cushion 10 and the second cushion 20 at the same time. Accordingly, it may be possible to inflate the first cushion 10 and the second cushion 20 in a designed direction using only one cover 80.

The seat airbag for a vehicle according to an exemplary embodiment of the present disclosure may further include a fourth fixing tether 90, a first end of which may be secured to the upper end portion or the side surface of the seatback S and a second end (e.g., an opposite end) of which may be coupled to a portion between a first end and a second end (e.g., opposite end) of the cover 80. The fourth fixing tether 90 may be coupled to a portion adjacent to the second end of the cover 80. The fourth fixing tether 90, the second end of which is coupled to the cover 80, may apply tension to the cover 80. Thus, the first cushion 10 and the second cushion 20 may be stably supported by the cover 80, which is in surface contact with the first cushion 10 and the second cushion 20 and thus presses the same downwards, and by the fourth fixing tether 90, which is coupled to the cover 80.

Furthermore, the cover 80 may be mounted on the first cushion 10 or the second cushion 20, which is located in the case C, in a folded state. When the first cushion 10 or the second cushion 20 is inflated, the cover 80 may be unfolded such that a first end thereof is fixed to the case C and a second end thereof (e.g., an opposite end) moves upwards and forwards. As shown in FIG. 13A, the cover 80 may be mounted on the first cushion 10 and the second cushion 20, which are disposed in the case C, in a folded state. The cover 80 may be mounted at the upper end portion of the seatback S together with the case C.

In one exemplary embodiment, the cover 80 may cover the upper portion of the case C in a folded state. In particular, the cover 80 may be folded in a zigzag form to be unfolded more easily simultaneously with inflation of the first cushion 10 and the second cushion 20. The cover 80 may have a cutting line T2 formed at a first end portion thereof, along which the cover 80 may be cut. Therefore, the cover 80 may be separated from the case C when tension having a predetermined magnitude or more is applied thereto.

A first end of the cover 80 may be secured to the case C, and the cutting line T2 may be formed between a portion adjacent to the first end of the cover 80 and the case C. The cover 80 may be cut along the cutting line T2 and may be separated from the case C. Specifically, when the first cushion 10 and the second cushion 20 are inflated, a reaction force acts on the cover 80. When tension having a predetermined magnitude or more is applied to the cover 80 due to the reaction force, the cover 80 may be torn and separated from the case C.

In one exemplary embodiment, a plurality of slits may be formed in the cutting line T2 to cause the cover 80 to tear in the direction in which the slits extend and to more easily separate the cover 80 from the case C. Alternatively, the cover 80 and the plurality of tethers may be cut by a separate device after causing the first cushion 10 and the second cushion 20 to be inflated in a designed direction. As a result, the inflatability of the first cushion 10, the second cushion 20, and the third cushion 30 may be improved.

As is apparent from the above description, the present disclosure provides a seat airbag for a vehicle capable of operating or functioning at any of a variety of angles to which a seat is oriented and at any of a variety collision angles, thereby safely protecting an occupant.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A seat airbag for a vehicle, comprising:
a first cushion and a second cushion disposed at an upper end portion of a seatback, the first cushion and the second cushion inflated upwards on opposite sides of an occupant and subsequently bent downwards from an upper side of the occupant to cause an end portion of each of the first cushion and the second cushion to be located in front of the occupant;
a third cushion disposed between the first cushion and the second cushion, the third cushion connecting the first cushion and the second cushion to each other;
a first connection tether having a first end coupled to an end portion of the first cushion or the second cushion, which is inflated toward a front side of the occupant, and a second end coupled to a middle portion of the first cushion or the second cushion, which is inflated toward an upper side of the occupant; and
a second fixing tether having a first end secured to an upper end portion or a side surface of the seatback, and a second end coupled to a portion between the first end and the second end of the first connection tether.

2. The seat airbag according to claim 1, wherein the first cushion and the second cushion receive gas from an inflator mounted at the upper end portion of the seatback, and wherein the first cushion and the second cushion are inflated independently on opposite sides of a head of the occupant.

3. The seat airbag according to claim 1, wherein the third cushion communicates with at least one of the first cushion or the second cushion to receive gas therefrom, and is inflated with the received gas.

4. The seat airbag according to claim 1, wherein, when the first cushion and the second cushion are fully inflated, the first cushion and the second cushion cover shoulders of the occupant from above and expand to be bent to a front side of the occupant.

5. The seat airbag according to claim 1, wherein, when the third cushion is fully inflated, the third cushion is located in front of the occupant and has a shape that is concavely recessed inwards to support a front side of a head of the occupant.

6. The seat airbag according to claim 1, further comprising:
a first fixing tether having a first end secured to an upper end portion or a side surface of the seatback and a second end coupled to an end portion of the first cushion or the second cushion,
wherein, when the first cushion or the second cushion is inflated, the first fixing tether applies tension to the first cushion or the second cushion to cause the end portion of the first cushion or the second cushion to move forwards along a predetermined curved path.

7. The seat airbag according to claim 6, wherein the first end of the first fixing tether is secured to the seatback via a driving device configured to operate to pull the first fixing tether at a predetermined time point.

8. The seat airbag according to claim 6, wherein a portion of the first fixing tether between the first end and the second end surrounds and supports each of side portions of the occupant to restrain movement of the occupant.

9. The seat airbag according to claim 1, wherein the second fixing tether is coupled to a portion adjacent to the first end of the first connection tether.

10. The seat airbag according to claim 9, further comprising:
a third fixing tether having a first end secured to the upper end portion or the side surface of the seatback, a second end coupled to a portion adjacent to the second end of the first connection tether.

11. A seat airbag for a vehicle, comprising:
a first cushion and a second cushion disposed at an upper end portion of a seatback, the first cushion and the second cushion inflated upwards on opposite sides of an occupant and subsequently bent downwards from an upper side of the occupant to cause an end portion of each of the first cushion and the second cushion to be located in front of the occupant;
a third cushion disposed between the first cushion and the second cushion, the third cushion connecting the first cushion and the second cushion to each other; and
a cover located at the upper end portion of the seatback in a folded state,
wherein, when the first cushion or the second cushion is inflated, the cover is unfolded on a top surface of the first cushion or a top surface of the second cushion and presses the first cushion or the second cushion downwards.

12. The seat airbag according to claim 11, wherein the cover is formed to extend in a lateral direction and presses the top surface of the first cushion and the top surface of the second cushion simultaneously.

13. The seat airbag according to claim 11, further comprising:
a cover fixing tether having a first end secured to an upper end portion or a side surface of the seatback, and a second end coupled to a portion between a first end and a second end of the cover.

14. The seat airbag according to claim 11, wherein the cover is mounted in a state of being folded on the first cushion or the second cushion disposed in a case, and wherein, when the first cushion or the second cushion is inflated, the cover is unfolded causing a first end thereof to be fixed to the case and a second end thereof to move upwards and forwards.

15. The seat airbag according to claim 14, wherein the cover includes a cutting line formed at a portion adjacent to the first end thereof, and wherein, when tension having a predetermined magnitude or more is applied to the cover, the cover is cut along the cutting line and is separated from the case.

* * * * *